Jan. 16, 1951        W. N. DEAN ET AL        2,537,973
RADAR INDICATION SYSTEM
Filed Jan. 14, 1944        3 Sheets—Sheet 1
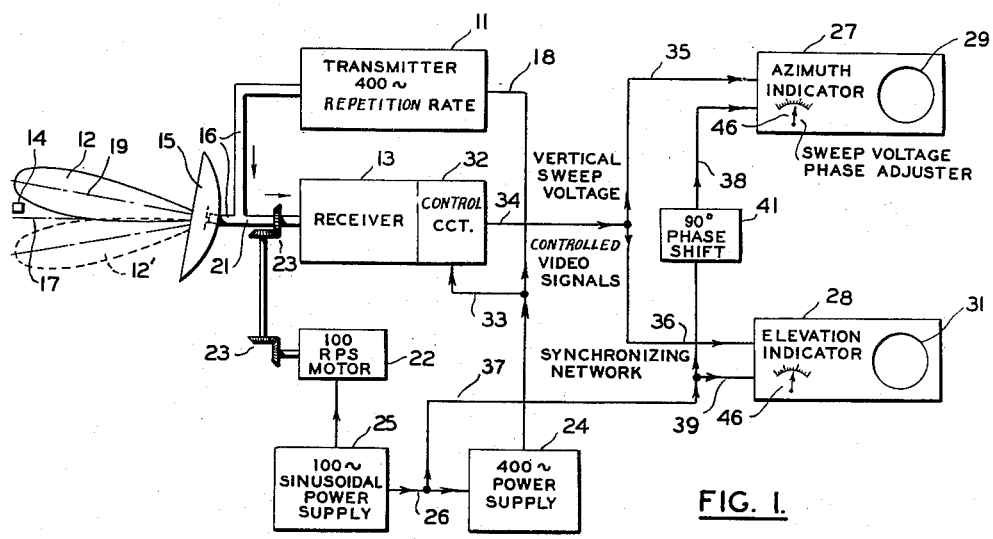
FIG. 1.
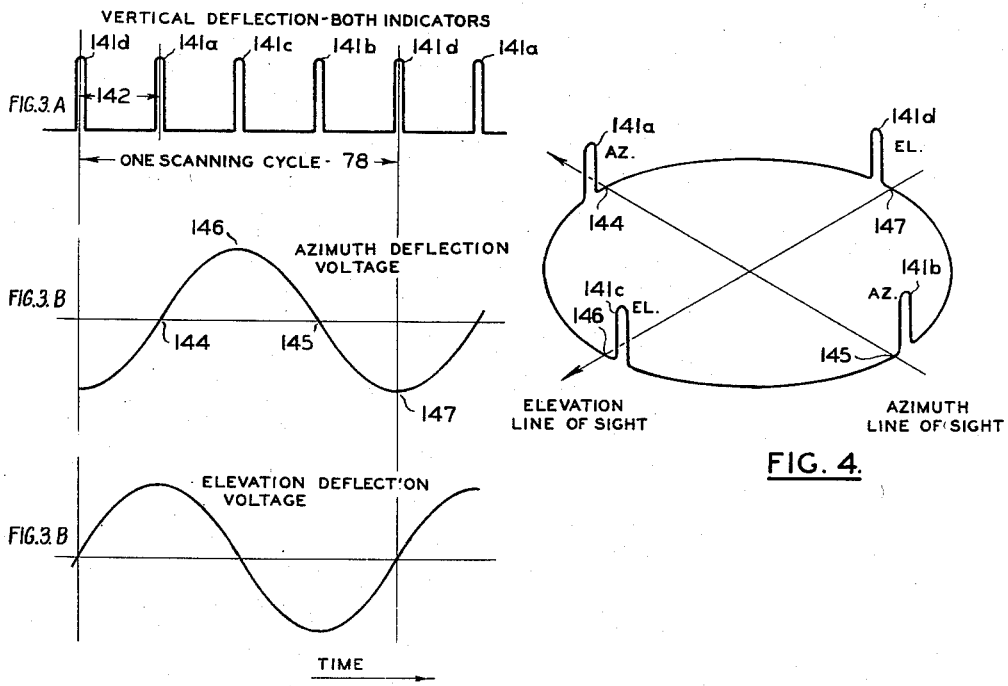
INVENTORS
W. N. DEAN
J. C. RUNDLETT
BY
Paul B. Hunter
ATTORNEY INVENTORS
W. N. DEAN
J. C. RUNDLETT
BY
Paul B. Hunter
ATTORNEY

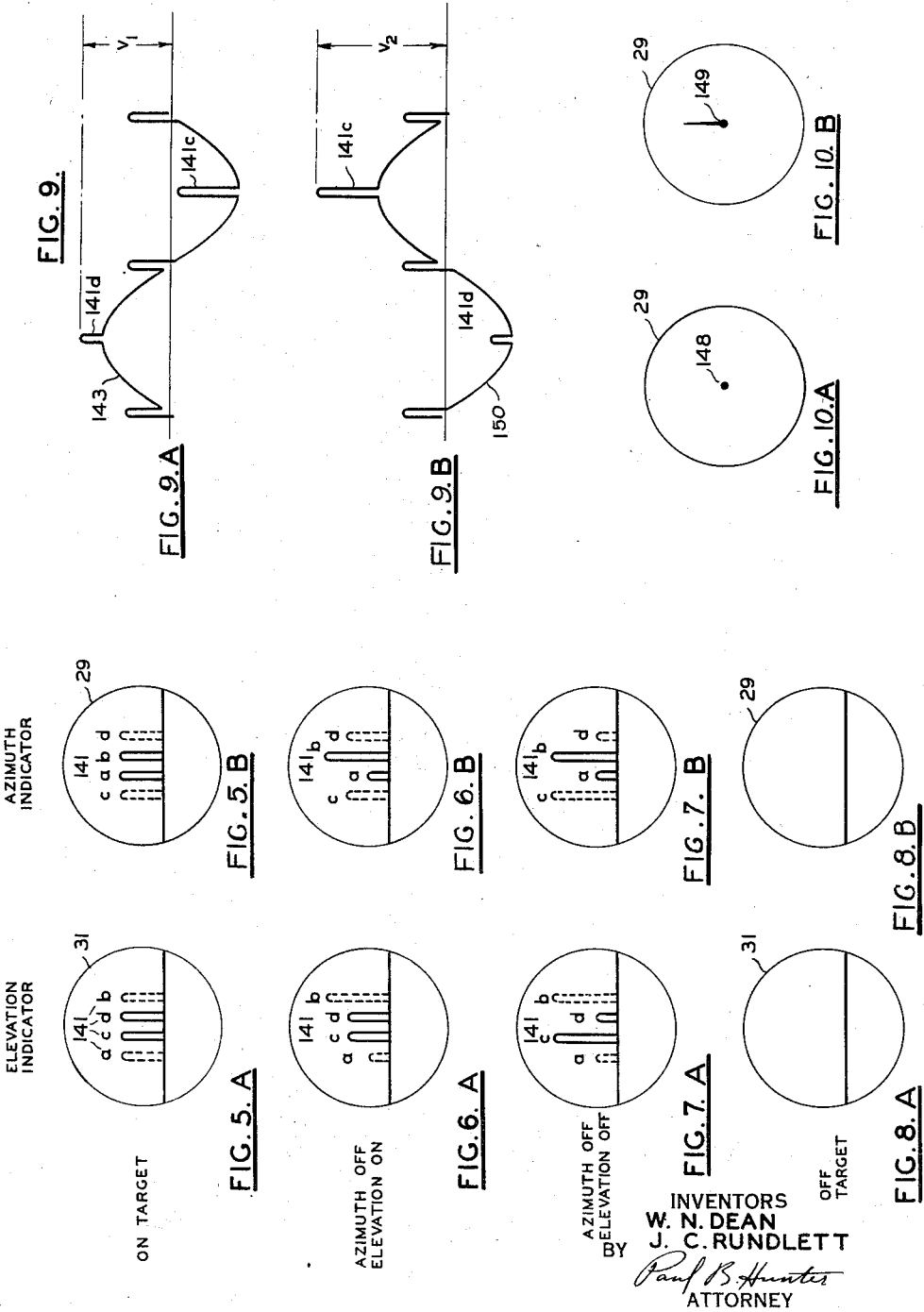

Patented Jan. 16, 1951

2,537,973

UNITED STATES PATENT OFFICE 2,537,973

RADAR INDICATION SYSTEM

Walter N. Dean, Larchmont, and James C. Rundlett, Pelham Manor, N. Y., assignors to The Sperry Corporation, a corporation of Delaware Application January 14, 1944, Serial No. 518,278

9 Claims. (Cl. 343—16)

Our invention relates to object locating systems and concerns particularly indicating systems therefor.

An object of our invention is to provide improved methods and apparatus for indication of angular position or of angular deviation from a reference direction of a target or other object to be located.

Another object of the invention is to provide an arrangement in which no indications are produced when the apparatus is pointed away from the target or when no target is present, and in which the condition of exact alignment on a target may be distinguished from the absence of any target or the failure of any input signal to be received by the apparatus.

A further object of the invention is to provide an arrangement for indicating the angle of deviation by matching of received pulses.

Still another object of the invention is to provide for separation of azimuth and elevation indicating pulses.

Still another object of the invention is to provide an arrangement for the indication of phenomena of a recurrent nature by an oscilloscope having a sub-synchronous time sweep.

Another object of our invention is to provide an object locating system in which an indication may be produced alternatively by the pip-matching method, or the error spot method. Each of these methods is described more fully hereinafter.

Still another object of the invention is to provide an arrangement for producing sharp indication of the pip-matching type with side signals eliminated.

Still another object of the invention is to provide an arrangement for producing error spot indications without ambiguity between indications produced when the apparatus is exactly on target, and when there is no target.

Other and further objects and advantages will become apparent as the description proceeds.

In carrying out our invention in its preferred form, we utilize a pulsed microwave transmitter with a receiver appropriate thereto, and means for rotating the beam or radiation pattern over which the microwave energy is transmitted and received for the purpose of making manifest the presence of a target or an object to be located by the reflection of signals from such an object. We provide apparatus responsive to the relative strengths of signals reflected from either side of the beam rotation axis for the purpose of indicating the angular deviation of the objects from the axis about which the microwave beam is being rotated. In order to produce a single pulse in each quadrant of the space in which the microwave beam is being rotated, the repetition rate of the pulse transmitter is made four times the angular speed of revolution of the microwave beam. Separate azimuth and elevation indicators are provided which may be of the cathode ray oscilloscope type.

The indicators are provided with transfer switches, enabling two different types of indications to be obtained, which will be identified as the error spot and the pip-matching types of indication. For the error spot type of indication, means are provided for producing a spot on the oscilloscope screen which is lengthened to a vertical bar in the presence of a target. A phase-sensitive circuit is provided which is responsive to received signals and to a reference voltage synchronous with the beam rotation, for deflecting the indicating bar to the right or to the left according to the sense and amount of angular deviation of the target from a reference direction. If the target lies exactly in the reference direction, the vertical bar is centered on the oscilloscope screen. This type of indication may be referred to as the "error spot" method.

For the pip-matching type of indication the indicators are provided with a sweep voltage synchronous with the speed of rotation of the microwave beam, the sweep voltage therefore being sub-synchronous with respect to the received pulses. A connection is provided for applying the received pulses to the signal deflection circuits of the indicators, and the time sweep circuits of the indicators are supplied with sine waves which are in quadrature so that one indicator produces a pair of pips or pulses which match in height when the center line of the apparatus or axis of rotation of the microwave beam is directed toward the target in azimuth, and the other indicator produces pulses which are matched in height when the said axis of rotation is directed toward the target in elevation. If the center line is not directed exactly toward the target in azimuth and/or elevation, however, the respective pips or pulses are of unequal height. This type of indication is conveniently designated the "pip-matching" method.

A better understanding of the invention will be afforded by the following detailed description considered in connection with the accompanying drawings in which:

Figure 1 is a schematic block diagram of one embodiment of our invention;

Figure 2:
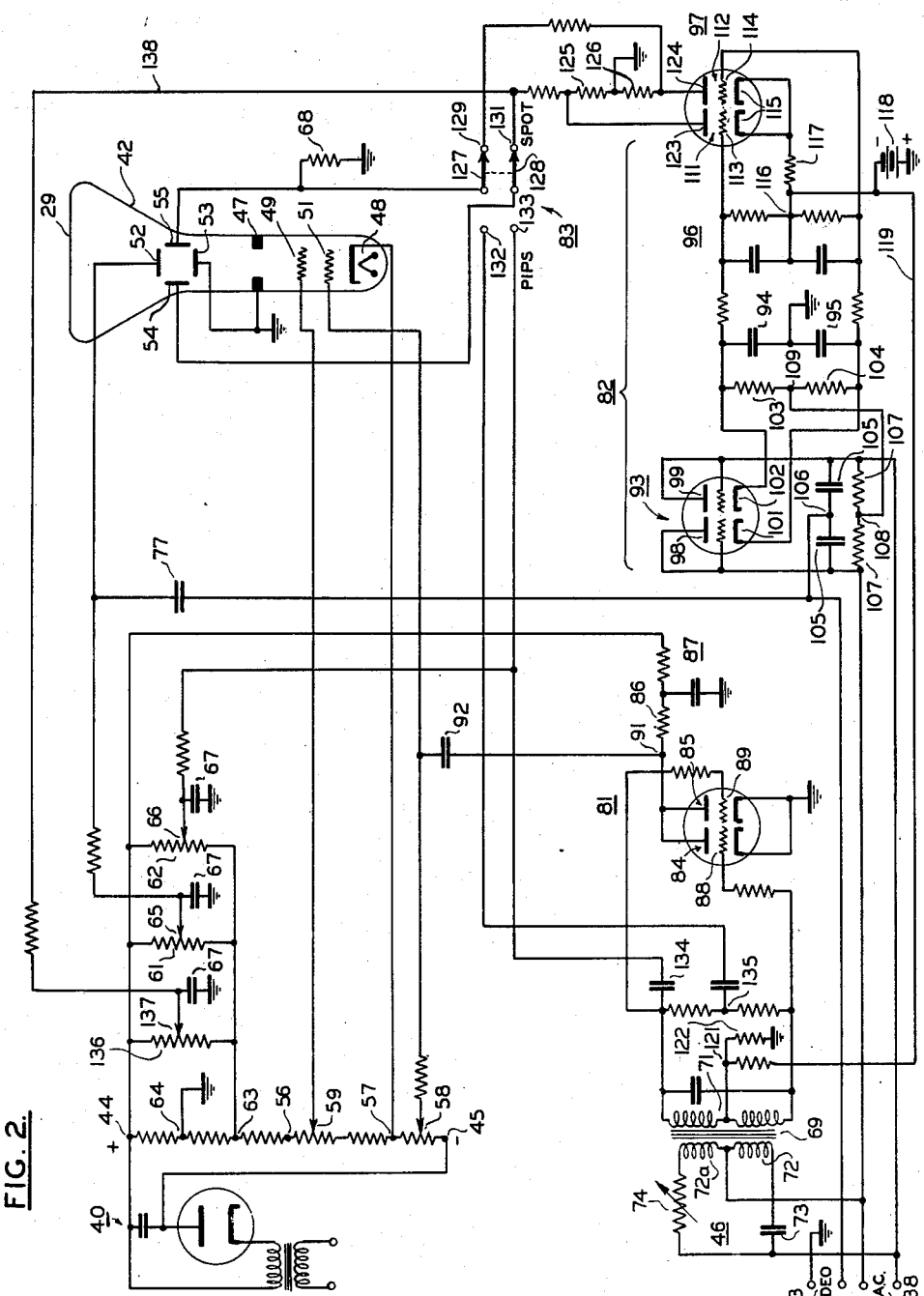
Figure 2 is an electric circuit diagram of one of the indicators represented in Figure 1.

Figures 3A, 3B, and 3C are graphs illustrating the phase relationship between the received pulses and the oscilloscope deflection voltages;

Figure 4 is a "perspective" diagram illustrating the manner in which matching pulses are obtained on the oscilloscope screen, elevation pulses are eliminated from the azimuth screen, and azimuth pulses are eliminated from the elevation screen;

Figures 5A and 5B to 8A and 8B are diagrams illustrating the pip-matching indications obtained under various conditions of angular position of the object to be located, or the absence of an object to be located;

Figures 9A and 9B are graphs illustrating the principle of operation employed for the error spot indication; and Figures 10A and 10B are diagrams illustrating the appearance of the indicator screen for the conditions of "no target" and "on target," respectively.

Like reference characters are utilized throughout the drawings to designate like parts.

As in apparatus heretofore known, the apparatus illustrated in Figure 1 includes a pulsed microwave transmitter 11 for projecting a beam 12 of microwave radiant energy, and a receiver 13 for responding to reflections of such pulses in case the microwave beam 12 should be intercepted by a target 14 causing reflection of the projected microwave energy. As in apparatus heretofore known, we may also employ a radiator 15 of the dipole and parabolic reflector type which is common to the transmitter 11 and the receiver 13 with suitable means (not shown) for preventing direct transfer of energy from the transmitter 11 to the receiver 13.

As in apparatus heretofore known, the frequency of the transmitter 11 may be such as to make desirable the use of transmission lines 16 of the hollow pipe wave guide type for connecting the transmitter 11 and the receiver 13 to the radiator 15.

In distinction from such previously known apparatus, however, the illustrated apparatus includes means for rotating the radiation pattern 12 of the transmitter 11 and receiver 13 about an axis of rotation 17 together with means for synchronizing or controlling the transmitter 11 and the receiver 13 so as to cause a single pulse to be transmitted after the radiation pattern 12 has executed each predetermined fraction, e. g., each quarter revolution about the axis 17. Any desired means may be provided for effectively causing the rotation of the radiation pattern 12 about the axis 17. For simplicity in the drawing it is assumed that this is accomplished by mounting the radiator 15 so that the beam center line 19 is slightly oblique with respect to the axis of rotation 17 and by providing means such as a rotatable hollow shaft 21 driven by a synchronous motor 22 through gearing 23 for physically rotating the radiator 15.

It will be understood, however, that it may be more convenient to rotate only a portion of the radiator 15, or to provide other means for causing rotation of the radiation pattern 12 without actual rotation of the entire radiator 15.

Although our invention is not limited to the use of a particular radio frequency or particular repetition rate of pulses, we have found that satisfactory results may be obtained when the microwave energy has a wavelength of 3 to 10 centimeters by utilizing a repetition rate of 400 cycles per second, for example. When such a repetition rate is desired, a 400-cycle power supply 24 may be provided with a synchronizing connection 18 to the transmitter 11, for causing the transmitter 11 to produce a train of microwaves having a relatively short duration such as one-half microsecond, for example, every 2500 microseconds.

For synchronizing the pulse repetition rate with the angular speed of revolution of the radiation pattern 12, the motor 22 may be a synchronous motor and a 100-cycle power supply 25 may be provided having a synchronizing connection 26 between it and the 400-cycle power supply 24. Since the means for synchronizing the 400-cycle power supply with the 100-cycle power supply is not part of our invention, it need not be illustrated or described in detail herein.

A suitable synchronizing arrangement is described in the patent of Walter Dean, No. 2,435,958, filed August 19, 1943, issued February 17, 1948, and assigned to the same assignee as the present application.

In order that angular indications of the position of the object 14 with respect to the axis 17 may be produced with separate indications in azimuth and elevation, a pair of indicators 27 and 28 is provided. These indicators contain suitable control circuits, to be described hereinafter, and cathode ray oscilloscope tubes having indicating screens 29 and 31, respectively.

For eliminating direct reception of transmitted energy by receiver 13 from transmitter 11, and to select the desired signal, a control circuit 32 is preferably provided, which supplies control voltage pulses to the receiver 13 which are synchronized with the repetition rate of the transmitter 11. As indicated schematically, a synchronizing connection 33 is provided between the control circuit 32 and the synchronizing line 18 to the transmitter 11.

It will be understood, however, that the representation of synchronizing means in the drawing is only schematic and that any suitable known means or arrangement for synchronizing the control circuit and the pulse repetition rate may be employed.

The receiver 13 is provided with an output connection or channel 34 at which controlled video signals appear, and branch connections 35 and 36 from the channel 34 are made to the vertical deflection circuits of the azimuth indicator 27 and of the elevation indicator 28.

In order that indicators 27 and 28 may be provided with a sinusoidally varying horizontal or time sweep voltage, the power supply 25 is preferably such as to produce a sinusoidal voltage. An output connection 37 from the power supply 25 is branched to form lines 38 and 39 connected to the horizontal sweep circuits of the indicators 27 and 28, respectively. Suitable means are provided for introducing a quadrature relationship between the voltages supplied over the lines 38 and 39. For example, a phase shifter 41 may be interposed in one of these lines; however, it will be understood that if a quarter phase power supply is utilized, separate connections from the phases may be made to the lines 38 and 39 obviating the need for any separate phase shifter.

Since the diagram of Figure 1 is only schematic, it is to be understood that our invention is not limited to the details of the schematically indicated means for interconnecting, phasing or synchronizing the various elements shown in the diagram.

Since the azimuth and elevation indicators 27 and 28 may be substantially identical, only one of them need be described. In the form represented in the circuit diagram of Figure 2, each indicator comprises a cathode ray oscilloscope 42, a pair of 100-cycle input terminals, viz., the sweep wave input terminals 38, a pair of video signal input terminals 43, a source of unidirectional voltage 40 having positive and negative terminals 44 and 45, respectively, an adjustable phase shifter 46 for adjusting the proximity of indicated pulses, and a suitable means for adjusting and selecting various voltages to be applied to the oscilloscope 42.

The oscilloscope 42 may be of substantially conventional form having an anode 47, an indirectly heated cathode 48, suitable control electrodes such as a focusing electrode 49, an intensity-control grid 51, and suitable beam deflection means. As illustrated, the beam deflection means takes the form of a pair of electrostatic deflection plates 52 and 53 for producing a vertical deflection, and a second pair of electrostatic deflectic deflection plates 54 and 55 for producing horizontal deflections.

It will be understood that the tube 42 is of the type in which a cathode ray beam (not shown) is emitted by the cathode 48, and strikes a point on the screen 29, determined by the potentials on the electrostatic deflection plates 52 to 55.

For providing voltages of suitable potential and for adjustability of certain of these voltages, a potentiometer 56 may be provided comprising a resistance connected between the D. C. input terminals 44 and 45 with an intermediate point 64 grounded.

For adjusting the beam intensity, an adjustable tap 58 may be provided on the potentiometer 56, and may be connected to the intensity control grid 51, and for beam focusing an adjustable tap 59 may be provided on the potentiometer 56 and connected to the focusing electrode 49. The cathode 48 is connected to a terminal 57 near the negative end of the potentiometer 56.

For beam centering, three centering potentiometers, 136, 61 and 62 may be connected between the positive terminal 44 of the D. C. power supply source, and a terminal 63 thereof, which is on the negative side of the ground terminal 64. The potentiometer 61 is provided with a tap 65 connected to one of the vertical plates 52 for vertical centering, and the potentiometer 62 is provided with an adjustable tap 66 connected to one of the horizontal deflection plates 54 for horizontal centering for "pip" system. Potentiometer 136 is used for centering on "spot." Preferably by-pass condensers 67 are connected between the centering taps 137, 65 and 66 and the ground connection.

The remaining vertical deflection plate 53 may be grounded to the anode 47, whereas the remaining horizontal deflection plate 55 is grounded through a resistor 68.

The sweep wave terminals 38 are coupled to the horizontal deflection plates 54 and 55 through the adjustable phase shifter 46. As shown, the phase shifter 46 may comprise a tapped primary transformer 69, having a secondary winding 71 coupled to the deflection plates 54 and 55. Half the primary winding 72 is connected in series with a phase-splitting condenser 73 and half with a phase-adjusting rheostat 74. The 100 cycle supply is connected between the junction of 73 and 74 and the center tap of primary 72.

The video signal input terminals 43 are coupled to the ungrounded vertical deflecting plate 52 through a coupling condenser 77.

For eliminating side signals when the pip-matching indication is employed, a blanking circuit 81 is provided, and for converting the video signals into suitable voltages for horizontal beam deflection when the error spot type of indication is desired, a phase-responsive circuit 82 is provided. For convenience in transferring the apparatus from one type of indication to another, a double-pole, double-throw switch 83 is provided.

The blanking circuit 81 comprises a pair of electric discharge devices shown as a twin triode vacuum tube including a pair of triode elements 84 and 85 connected as mixers, and having a common anode resistor 86.

The anode resistor 86 is connected to the terminal 44 of the high voltage power supply 40 through a decoupling circuit 87. The triodes 84 and 85 have control electrodes or grids 88 and 89, respectively, connected in opposite phase relation to the output of the phase shifter 46, for example, by connection to the opposite ends of the transformer secondary winding 71.

The tubes 84 and 85 have a common anode terminal 91 coupled through a condenser 92 to the control electrode or grid 51 of the cathode ray oscilloscope tube 42.

The phase-responsive circuit 82 comprises suitable phase detectors such as a conventional double diode phase detector 93, a pair of charge collector condensers 94 and 95, a filter circuit 96 and a push-pull amplifier 97 with output connections to the horizontal sweep plates 54 and 55 of the oscilloscope tube 42.

The phase detector 93 (as shown) comprises a twin triode vacuum tube connected as a pair of diodes with anodes 98 and 99 connected to opposite polarity terminals of the sweep voltage supply terminals 38, serving as a reference-voltage source and cathodes 101 and 102 connected to opposite ends of a pair of series-connected condenser-bleeding resistors 103 and 104.

For coupling the video input to the phase detector 93 a pair of coupling condensers 105, having a junction terminal 106, is connected in series across the phase detector anodes 98 and 99. The junction terminal 106 is connected to the ungrounded terminal of the video input terminals 43. A pair of resistors 107 is also connected in series between phase detector anodes 98 and 99, and the junction terminal 108 of the resistors 107 is connected to the junction terminal 109 of the resistors 103 and 104.

The push-pull amplifier 97 comprises a pair of grid controlled electric discharge devices such as triode vacuum tubes shown as units 111 and 112, of a twin triode with control electrodes 113 and 114 connected across the output terminals of the filter 96, and cathodes 115 connected to a mid-potential terminal 116 of the filter 96, through a cathode resistor 117.

In order to produce anode potentials having suitable relationship to the potentials existing in the cathode ray oscilloscope tube 42 a negative voltage source such as battery 118 is provided having a grounded positive terminal and negative terminal to which the cathode resistor 117 is connected. The battery 118 may be utilized also for biasing the blanking circuit 81 by providing a bias connection 119 between the negative terminal of the battery 118, and a mid-terminal 121 of the phase shifter transformer secondary winding 71. A grid leak resistor 122 is connected between the point 121 and ground.

The amplifier triodes 111 and 112 have anodes connected to ground through load resistors 125 and 126. The anodes 123 and 124 are connected, respectively, to the horizontal deflection plates 54 and 55 of the oscilloscope tube 42 when the transfer switch 83 is in the error spot position.

The transfer switch 83 includes a pair of movable blades 127 and 128, a first pair of stationary contacts 129 and 131, and a second pair of stationary contacts 132 and 133. The stationary contacts 129 and 131 are connected to the amplifier anodes 123 and 124, respectively, through suitable current limiting resistors, and the stationary contacts 132 and 133 are coupled to the secondary winding 71 of the phase shifter transformer 69 through condensers 134 and a voltage-dividing resistor 135.

The adjustable tap 66 of the potentiometer 62 is connected to the switch terminal 133 for adjusting horizontal centering of the cathode ray spot when the pip-matching indication is employed.

For horizontally centering when error-spot indication is employed, a separating horizontal centering potentiometer 136 may be provided, which is connected in parallel with the potentiometers 61 and 62, and has an adjustable tap 137 connected through a high resistance conductor 138 to the stationary transfer switch terminal 131.

When the transfer switch blades 127 and 128 are moved to the left so as to break connection with the terminals 129 and 131, and make connection with the terminals 132 and 133, respectively, a sinusoidal sweep voltage is applied to the horizontal deflection plates 54 and 55 of the oscilloscope 42, this voltage being derived from the sweep wave terminals 38.

Video signals having wave form illustrated in Fig. 3A, are applied to the vertical deflection plates 52 and 53, being derived from the video input terminals 43 which are connected to the output of the receiver 13 (shown in Fig. 1).

Since the indicators 27 and 28 of Figure 1 operate in a similar manner, the operation of only one of them need be described in detail.

Referring, for example, to the indicator 27, the sweep voltage appearing at the sweep voltage terminals 38 has a wave form represented by Figure 3B, and the video signals derived from the receiver 13 have a wave form represented by Figure 3A. It is to be understood that in the graphs 3A, 3B and 3C, voltage is measured in a vertical direction, and elapsed time is measured in a horizontal direction.

Since the transmitter 11 has a pulse rate which is four times the frequency of the sweep voltage source 25, four received pulses 141a, 141c, 141b, 141d (collectively designated by the numeral 141) will occur for each cycle of the azimuth sweep voltage shown in Figure 3B. The pulses 141, as shown in Figure 3A, will be substantially equally spaced by distances 142 which are one-fourth the scanning cycle 143.

The phase shifter 46 of Figure 2 is so adjusted that alternate pulses 141a and b occur while the azimuth sweep voltage is very nearly zero as at the points 144 and 145, whereas the remaining two pulses 141c and d occur while the azimuth sweep voltage has nearly maximum positive and negative values, respectively, as at points 146 and 147.

As the radiation pattern 12 of the radiator 15 is rotated by the motor 22, its axis of symmetry 19 describes a cone of revolution, and the beam 12 rotates between two extreme positions in any one plane. If the vertical plane be regarded as the plane of the paper, for the sake of illustration, the full-line representation of the beam 12 is assumed to be the uppermost position, and the lowermost position is represented by a pattern 12' shown in dotted lines.

Preferably the phase relationship of the power supplies 24 and 25 to the angular position of the synchronous motor 22 is such that pulses are produced when the microwave beam 12 is in its uppermost position and in lowermost position, and also in its extreme right and left positions.

Owing to the fact that the pulse repetition rate is four times the sweep frequency, four pulses or video signals will appear on the cathode ray screen 29, and for the sake of identification these pulses are resignated as 141a, 141b, 141d and 141c, in the diagrams but designated collectively by the numeral 141.

For convenience in the drawing the deflection sweep voltages of Figures 3B and 3C have been shown as exactly phased with the pulses 141, that is, the zero points of the sweep voltages coincide with the peaks of the pulses. However, in order to separate adjacent pulses sufficiently for visual comparison, the phase shifters 46 are so adjusted as to dephase the voltages slightly. Accordingly, the two pulses 141a and 141b which occur at the times 144 and 145 actually occur at small opposite polarity values of the sweep voltage of Figure 3B and are slightly separated horizontally in the cathode ray screen as shown in Figures 5A and B to 8A and B.

It will be understood that the points 144 and 145 correspond to the instants when the microwave beam 12 is nearly at its extreme righthand and lefthand positions.

The side pulses 141c and 141d may be separated from the pair of center pulses 141a and 141b by utilizing an azimuth sweep voltage of adequate amplitude. However, it is desirable that the pulses have considerable time duration in order to operate phase detectors properly and it is also desirable that the pulses appear narrow; consequently the sweep is preferably attenuated so that all four of the pulses would appear near the center of the cathode ray oscilloscope screen, except for the action of the blanking circuit 81.

Each time the sweep voltage across the secondary winding 71 of the transformer 69, applied to the blanking tube grids 88 and 89, rises appreciably (positive or negative), one or the other of the triodes 84 and 85 is driven strongly conducting, causing the anode terminal 91 to fall in potential. The negative pulse produced thereby is transferred through the coupling condenser 92 to the control grid 51 of the cathode ray oscilloscope tube 42 so as to cut off the oscilloscope tube. Since the side pulses 141c and 141d are produced as indicated by Figure 3B, at the instants 146 and 147 of substantially maximum sweep voltage, it is apparent that the oscilloscope tube 42 is blanked out during the instants of occurrence of the pulses 141c and 141d so that these do not appear on the screen of the oscilloscope tube 42. Accordingly, the representations of the pulses 141c and 141d in Figure 5B are in dotted lines, whereas the center pulses 141a and 141b are shown in full lines.

Inasmuch as the azimuth and elevation sweep voltages shown in Figures 3B and 3C are in phase quadrature, a similar indication will appear on the screen 31 of the elevation indicator 31, except for the fact that the relationship of the pulses is reversed. In the latter case the pulses 141c and 141d are the center pulses, which appear on the screen 31, and the side pulses 141a and 141b are blanked out, as represented in Figures 5A, 6A and 7A.

In Figures 5A and 5B all of the pulses are shown with equal magnitude, indicating that signals of the same strength are reflected to the receiver 13 when the microwave beam 12 is in each of its four positions during which pulses are projected. This condition occurs only when the axis of rotation 17 is directed toward the object 14. Accordingly, screen indications such as shown in Figures 5A and 5B represent the condition of "on target" with respect to both elevation and azimuth. On the other hand, if the target is a little to the right in azimuth but at zero elevation, the screen indications will be as in Figures 6A and 6B. In this case the elevation pulses 141c and 141d will be of equal amplitude, but the azimuth pulses 141a and 141b will have unequal amplitude. This results from the fact that when the target 14 is to the right of the beam axis of rotation 17, stronger pulses will be directed to the target, and reflected therefrom when the beam 12 is also to the right than when it is to the left in a position 12'.

Figures 7A and 7B represent the indications obtained when the target deviates from the beam axis of rotation 17 with respect to both azimuth and elevation.

On the othre hand if there is no target, or the target is so far from the axis 17 as not to reflect any energy for any position of the microwave beam 12, no signal will be received by the receiver 13 and both oscilloscope screens 31 and 29 will appear blank as in Figures 8A and 8B. For this reason there is no danger that the operator of the apparatus will mistake a condition of "no target" for an exactly balanced condition when the axis 17 is pointing directly toward the target.

When the transfer switch 83 is moved to the right to the position in which it is illustrated in Figure 2, no sine wave sweep voltage is applied to the horizontal deflection plates 54 and 55; instead a spot is produced on the screen as shown in Figure 10, and this spot moves to the right or to the left, according to the relative angular positions of the target 14 and the beam rotation axis 17. This results from the action of the phase responsive circuit 82, supplied with a sinusoidal reference voltage from its terminals 38. Since the effective pulses occur at zero sweep voltage when the pip-matching indications are produced, whereas the effective pulses occur at maximum positive and negative sweep voltage when the error spot indication is produced, a 90° phase shift between the two voltages is required. This is done in the phase shifter 46. Referring to Figures 9A and 9B, sinusoidal voltages 143 and 150 of opposite polarity are applied to the phase detector anodes 98 and 99, whereas, the video signals 141 of Figure 3A are applied to both anodes 98 and 99 with like polarity. For the sake of illustration it is assumed that the angular position of the target is such that the pulse 141c received when the beam 12 is in its uppermost position, is greater than the pulse 141d received when the beam 12 is in its lowermost position. These pulses occur when the reference voltage waves 143 and 150 have their peak values. The total peak value of the voltage applied to the phase detector anode 98 is the sum of the sine wave and the pulse or voltage $V_1$, and the sum of voltages applied to the phase detector anode 99 is the voltage $V_2$. In this case the voltage $V_2$ is greater than the voltage $V_1$, and the condenser 95 is charged to a higher maximum value than the condenser 94, through the rectifiers of the phase detector 93. The difference in potential is filtered by the filter 96 and applied to the push-pull amplifier 97 which in turn applies a horizontal deflection voltage to the plates 54 and 55, causing the cathode ray beam of the tube 42 to deflect from the center position.

Without any voltage applied to the vertical plates 52 and 53, the cathode ray beam will produce a spot 148 on the oscilloscope screen 29, as shown in Figure 10A, this spot being deflected to the right or left according to the angular deviation of the target. However, in this case pulse deflection voltage is applied to the vertical deflection plates 52 and 53 whenever a signal is received, and accordingly a vertical line or bar 149 is produced on the oscilloscope screen and the bar 149, as shown in Figure 10B, moves to the right or left according to the angular deviation of the target. In case there is no target intercepted the bar 149 disappears and only the spot 148 remains. The operator of the apparatus therefore knows that existence of the spot 148 at the center of the target does not indicate that the apparatus is "on target" but merely the absence of any target.

We have herein shown and particularly described certain embodiments of our invention and certain methods of operation embraced therein for the purpose of explaining its principle of operation and showing its application but it will be obvious to those skilled in the art that many modifications and variations are possible and we aim, therefore, to cover all such modifications and variations as fall within the scope of our invention which is defined in the appended claims.

Certain subject matter disclosed in the present application is disclosed and claimed in application S. N. 518,277 in the name of Robert I. Anderson, filed January 14, 1944.

What is claimed is:

1. An object locating system comprising in combination means for transmitting and receiving a rotatable beam of microwave energy, means for pulsing the beam at a repetition rate which is a multiple of the speed of rotation of the beam, a two-dimensional indicator having means for deflecting the indicator in one dimension in response to received signals, means for sweeping the indicator in the other dimension at a frequency equalling the speed of rotation of the microwave beam, and means for suppressing alternate received signals.

2. An indicating system comprising a two-dimensional indicator having a pair of deflection circuits, one for each dimension, input terminals to which video signals of a given frequency may be applied, a connection from said input terminals to one of said deflection circuits, a sweep wave generator of fractional frequency connected to the other of said deflection circuits, and means responsive to values of sweep wave output exceeding a predetermined value for suppressing video signals in the indicator.

3. An object locating system, comprising in combination means for projecting and receiving radiant energy along a rotating beam, means for pulsing the transmitting means at a frequency which is a multiple of the beam rotation speed, means for comparing the magnitudes of alternate received signals, a two-dimensional indicator, means for deflecting the indicator in one dimension in response to difference in magnitude of received signals, and means for deflecting the indicator in the other dimension in response to received signals, whereby a bar indication is produced when the signals are received, the indication is deflected to the right or to the left with deviation of angular position of the located object from the beam axis of rotation, and the bar disappears in the absence of received signals.

4. An indicator for an object locating system, comprising in combination an oscilloscope having a control grid and a pair of deflection circuits for deflecting a spot in mutually transverse dimensions, a transfer switch with first and second pairs of terminals for producing alternative types of indications, video signal input terminals to which video signals of a given frequency may be applied, a sine wave voltage source having a frequency which is a fraction of the frequency of the voltage at said video signal input terminals, connections between the horizontal deflection circuit and said transfer switch, connections between the sine wave voltage source and said first pair of transfer-switch terminals, a blocking circuit interposed between the sine wave voltage source and the control grid of the oscilloscope, and a phase-responsive circuit interposed between the sine wave voltage source and said second pair of transfer-switch terminals, said phase-responsive circuit having input connections from the video input terminals, said vertical deflection circuit having input connections from the video input terminals, whereby received video signals produce a pair of adjacent pulses in the oscilloscope screen when said transfer switch is in a first position and produce a vertical bar on the screen when the transfer switch is in a second position, said bar and said pulses disappearing in the absence of a received video signal, variation in relative strengths of alternate received signals producing variations in relative height of the indicated pulses when said transfer switch is in said first position and producing lateral deflections of the bar when the switch is in said second position.

5. An object locating system comprising in combination means for transmitting and receiving a rotatable beam of microwave energy, means for pulsing a beam at a repetition rate which is a multiple of the speed of rotation of the beam, an indicator responsive to received signals, and means for selectively converting the received signals in the indicator to a spot movable in response to variations in relative strength of signals received in different positions of the beam, or converting the received signals into a pair of pulse representations having magnitudes corresponding to the relative strengths of such received signals.

6. An indicator for an object locating system, comprising in combination an oscilloscope having a pair of deflection circuits for deflecting a spot in mutually transverse dimensions, a change-over switch with first and second pairs of terminals for producing alternative types of indications, video signal input terminals to which video signals of a given frequency may be applied, a coupling between said video signal input terminals and one of said deflection circuits, a coupling between said change-over switch and the other of said deflection circuits, a sine-wave voltage source having a frequency which is a fraction of the video signal frequency, a coupling between said sine-wave voltage source and said first pair of change-over switch terminals for applying a sinusoidal sweep to the oscilloscope, and means interposed between said second pair of change-over switch terminals and said sine-wave voltage source for producing a deflectible spot in the oscilloscope.

7. Apparatus as in claim 6, with a control grid included in the oscilloscope and a blocking circuit interposed between the sine wave source and the control grid responsive to excess of said sine wave voltage over a predetermined value.

8. An indicator for an object locating system, comprising in combination an oscilloscope having a pair of deflection circuits for deflecting a spot in mutually transverse dimensions, video signal input terminals to which video signals of a given frequency may be applied, a sine wave voltage source having a frequency which is a fraction of the frequency of the voltage at the video signal terminals, and a phase-responsive circuit interposed between one of the deflection circuits of the oscilloscope and both said sine wave voltage source and said video input terminals, the other deflection circuit of the oscilloscope being coupled to the video signal input terminals, whereby received video signals produce a vertical bar on the screen which is laterally deflected in response to signal strength and variations in phase relationship between received signals and sinusoidal voltages.

9. An indicator for an object locating system, comprising in combination an oscilloscope having a control grid and first and second deflection circuits for deflecting a spot in mutually transverse dimensions to which video signals of a given frequency may be applied, a sine wave voltage source having a frequency which is a fraction of the frequency of the voltage at the video signal terminals, connections between the first deflection circuit and said sine wave voltage source, a blocking circuit interposed between the sine wave voltage source and control grid of the oscilloscope, and an input connection from the video input signal terminals to the second deflection circuit, whereby received video signals produce a pair of adjacent pulses on the oscilloscope screen varying in relative height in response to variations in strength of alternate signals.

WALTER N. DEAN.
JAMES C. RUNDLETT.

REFERENCES CITED

The following references are of record in the file of this patent:

UNITED STATES PATENTS

| Number | Name | Date |
|---|---|---|
| 2,036,187 | Chromy | Apr. 7, 1936 |
| 2,059,004 | Leeds | Oct. 27, 1936 |
| 2,165,256 | Hansell | July 11, 1939 |
| 2,280,670 | Spielman | Apr. 21, 1942 |
| 2,283,951 | Ripley | May 26, 1942 |
| 2,286,894 | Browne et al. | June 16, 1942 |
| 2,343,988 | Mahoney, Jr. | Mar. 14, 1944 |
| 2,415,566 | Rhea | Feb. 11, 1947 |
| 2,416,088 | Deerhake | Feb. 18, 1947 |

FOREIGN PATENTS

| Number | Country | Date |
|---|---|---|
| 552,072 | Great Britain | Mar. 22, 1943 |